(12) United States Patent
Salunkhe et al.

(10) Patent No.: US 9,587,519 B2
(45) Date of Patent: Mar. 7, 2017

(54) MODULAR INDUSTRIAL GAS TURBINE EXHAUST SYSTEM

(71) Applicants: Anil L. Salunkhe, Charlotte, NC (US);
John A. Orosa, Palm Beach Gardens, FL (US); Yevgeniy Shteyman, West Palm Beach, FL (US); Matthew R. Porter, West Palm Beach, FL (US); Lijuan Han, Simpsonville, SC (US); Matthew J. Delisa, III, West Palm Beach, FL (US); Daniel F. Riveros, Port St. Lucie, FL (US)

(72) Inventors: Anil L. Salunkhe, Charlotte, NC (US);
John A. Orosa, Palm Beach Gardens, FL (US); Yevgeniy Shteyman, West Palm Beach, FL (US); Matthew R. Porter, West Palm Beach, FL (US); Lijuan Han, Simpsonville, SC (US); Matthew J. Delisa, III, West Palm Beach, FL (US); Daniel F. Riveros, Port St. Lucie, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 734 days.

(21) Appl. No.: 14/087,086

(22) Filed: Nov. 22, 2013

(65) Prior Publication Data
US 2015/0143816 A1    May 28, 2015

(51) Int. Cl.
*F01D 25/30* (2006.01)
*F02K 1/04* (2006.01)
(Continued)

(52) U.S. Cl.
CPC ............. *F01D 25/30* (2013.01); *F01D 9/041* (2013.01); *F01D 25/162* (2013.01);
(Continued)

(58) Field of Classification Search
CPC . F02C 7/20; F01D 25/30; F01D 25/28; F01D 25/24; F01D 25/162; F02K 1/04; F02K 1/80; F05D 2240/301
See application file for complete search history.

(56) References Cited

U.S. PATENT DOCUMENTS 2,809,491 A * 10/1957 Wosika ..................... F02K 1/04
138/37
4,989,406 A * 2/1991 Vdoviak ............... F01D 25/162
244/117 A
(Continued)

OTHER PUBLICATIONS

V. Vassiliev et al., "Experimental and Numerical Investigation of the Impact of Swirl on the Performance of Industrial Gas Turbines Exhaust Diffusers", Proceedings of ASME Turbo Expo 2003, Power for Land, Sea, and Air, Jun. 16-19, 2003, Atlanta, Georgia, USA, 11 pages.

*Primary Examiner* — Andrew Nguyen

(57) ABSTRACT

An integrated single-piece exhaust system (SPEX) with modular construction that facilitates design changes for enhanced aerodynamics, structural integrity or serviceability. The SPEX defines splined or curved exhaust path surfaces, such as a series of cylindrical and frusto-conical sections that mimic curves. The constructed sections may include: (i) a tail cone assembly fabricated from conical sections that taper downstream to a reduced diameter; or (ii) an area-ruled cross section axially aligned with one or more rows of turbine struts; or both features. Modular inner and outer diameter inlet lips enhance transitional flow between the last row blades and the SPEX, as well as enhance structural integrity. Modular strut collars have large radius profiles between the SPEX annular inner diameter and outer diameter flow surfaces, for enhanced airflow and constant (Continued)

thickness walls for uniform heat transfer and thermal expansion. Scalloped mounting flanges enhance structural integrity and longevity.

17 Claims, 10 Drawing Sheets

(51) Int. Cl.
  *F02K 1/80* (2006.01)
  *F01D 9/04* (2006.01)
  *F01D 25/16* (2006.01)
  *F01D 25/24* (2006.01)

(52) U.S. Cl.
  CPC .............. *F01D 25/243* (2013.01); *F02K 1/04* (2013.01); *F02K 1/80* (2013.01); *F05D 2230/51* (2013.01); *F05D 2250/232* (2013.01)

(56) References Cited

U.S. PATENT DOCUMENTS

| | | |
|---|---|---|
| 5,417,545 A | 5/1995 | Harrogate |
| 6,418,710 B1 | 7/2002 | Perrier et al. |
| 6,866,479 B2 * | 3/2005 | Ishizaka ................ F01D 25/30 415/209.1 |
| 7,032,387 B2 | 4/2006 | Germain et al. |
| 7,410,343 B2 | 8/2008 | Wakazono et al. |
| 7,559,747 B2 | 7/2009 | Mohan et al. |
| 7,784,284 B2 | 8/2010 | Brunet et al. |
| 7,857,594 B2 | 12/2010 | Kidikian et al. |
| 7,891,165 B2 | 2/2011 | Bader et al. |
| 8,157,509 B2 | 4/2012 | Black et al. |
| 8,166,767 B2 | 5/2012 | Grivas et al. |
| 8,281,603 B2 | 10/2012 | Johnson |
| 8,388,307 B2 | 3/2013 | Smoke et al. |
| 8,408,011 B2 * | 4/2013 | Fontaine ................ F01D 25/162 228/101 |
| 8,453,464 B2 | 6/2013 | Durocher et al. |
| 2005/0172607 A1 | 8/2005 | Ishizaka et al. |
| 2006/0042223 A1 * | 3/2006 | Walker ................... F01D 9/065 60/39.08 |
| 2010/0135786 A1 * | 6/2010 | Manteiga ................ F01D 9/065 415/232 |
| 2011/0005234 A1 * | 1/2011 | Hashimoto ............. F01D 25/30 60/796 |
| 2011/0016883 A1 | 1/2011 | Clemen |
| 2011/0036068 A1 | 2/2011 | Lefebvre et al. |
| 2012/0144836 A1 * | 6/2012 | Ress, Jr. ................. F01D 25/30 60/767 |
| 2012/0198810 A1 | 8/2012 | Ansari et al. |
| 2012/0204569 A1 | 8/2012 | Schubert |
| 2013/0042628 A1 * | 2/2013 | Witlicki ................. F01D 17/08 60/796 |
| 2013/0167552 A1 | 7/2013 | Keny et al. |

* cited by examiner

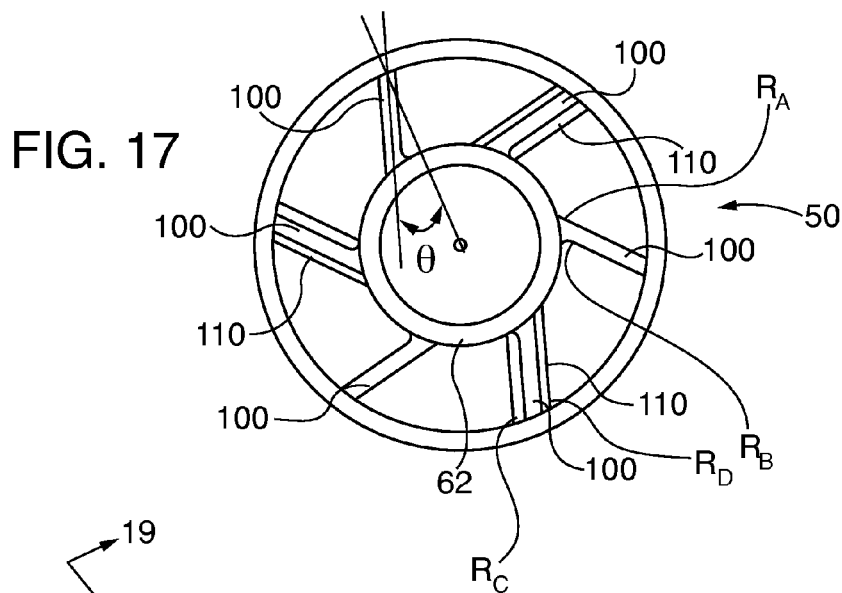
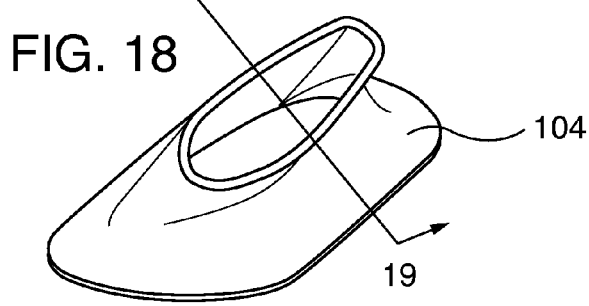
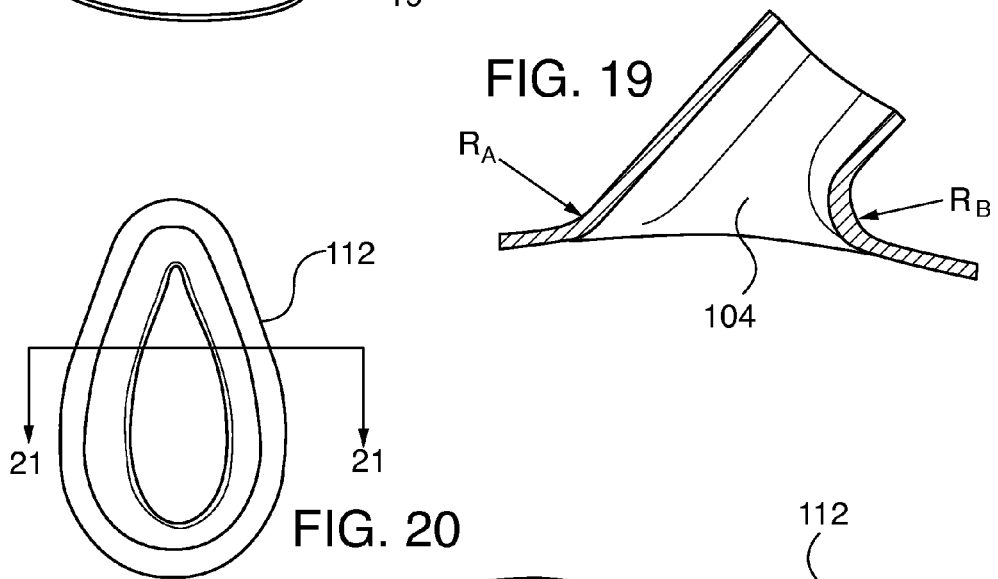

MODULAR INDUSTRIAL GAS TURBINE EXHAUST SYSTEM

CROSS-REFERENCE TO RELATED APPLICATIONS

The following family of five related co-pending United States utility patent applications is being filed concurrently on the same date, which are all incorporated by reference herein:

"Industrial Gas Turbine Exhaust System With Splined Profile Tail Cone", filed on Nov. 22, 2013, Ser. No. 14/087,040;

"Industrial Gas Turbine Exhaust System Diffuser Inlet Lip", filed on Nov. 22, 2013, Ser. No. 14/087,042;

"Industrial Gas Turbine Exhaust System With Area Ruled Exhaust Path", filed on Nov. 22, 2013, Ser. No. 14/087,050;

"Industrial Gas Turbine Exhaust System With Modular Struts and Collars", filed on Nov. 22, 2013, Ser. No. 14/087,060; and "Modular Industrial Gas Turbine Exhaust System", filed on Nov. 22, 2013, Ser. No. Ser. No. 14/087,086.

BACKGROUND OF THE INVENTION

1. Field of the Invention

Embodiments of the invention relate to industrial gas turbine exhaust systems, and more particularly to modular design, drop-in exhaust systems with a plurality of available enhanced exhaust flow path aerodynamic features, including, among others: flow path transition at the last blade row and diffuser interface inner and/or outer diameters; diffuser flow path angles that individually and severally in various combinations suppress flow separation and enhance pressure recovery; extended center body with a splined, compound curve tail cone or a multi-linear tail cone mimicking a splined compound curve; and turbine exhaust strut shapes with reduced trailing edge radius and increased manifold cast collar flow path radii. Embodiments of the modular drop-in exhaust system invention are also directed to enhanced structural integrity and serviceability features, including among others: last row turbine blade accessibility; turbine exhaust case (TEC) and/or turbine exhaust manifold (TEM) support struts with constant thickness vertical/radial cross section collars; modular support struts; single- or multi-radius, scalloped mounting flanges for fatigue resistance; enhanced mounting flange accessibility and mounting flange fastener replacement. The various features described herein may be utilized jointly and severally, in any combination.

2. Description of the Prior Art

Industrial gas turbine (IGT) exhaust system design often require balancing of competing objectives for aerodynamic efficiency, structural longevity, manufacture ease and cost, as well as installation and field service ease. For example, an IGT exhaust system designed to satisfy only aerodynamic objectives might comprise one or more metal castings/fabrications mimicking the construction of the compressor, combustor and/or turbine sections, airflow-optimized for the engine. That aero-optimized design casting/fabrication would not be readily adaptable to accommodate airflow parameters if other portions of the IGT design were modified. For example, the exhaust system would need to be re-optimized (with the expense of new castings/fabrications) if new turbine blade/vane designs were incorporated into the engine. Only specific portions of the aero optimized design castings/fabrications might experience thermal damage necessitating replacement after service, while other portions might not experience any discernible wear. Replacement of the entire exhaust as a repair solution for only localized wear would not be cost effective. A more desirable manufacturing and/or service repair solution would be creation of an exhaust system design (including, by way of example, a modular exhaust system design) that facilitates replacement of worn portions and periodic upgrades of the system (including upgrades to increase exhaust system longevity and durability as their needs are recognized over time) without requiring redesign and fabrication of an entirely new exhaust. Exhaust system manufacturing and service objectives include ease of initial manufacture, installation, field repair and upgrades during the service life of the IGT engine with minimal service downtime, so that the engine can be utilized to generate power for its electric grid.

Some known IGT exhaust designs are shifting to so-called single piece exhaust systems (SPEX) that in some cases facilitate drop-in connection to the turbine section. Some of these SPEX designs couple a generally annular turbine exhaust case (TEC) to the downstream portion of the IGT engine turbine section, and in turn couple a separate turbine exhaust manifold (TEM) to a downstream end of the TEC. Both the TEC and TEM have diffuser sections that mate to each other and when so mated form inner and outer exhaust cases. The turbine exhaust path is formed between inner facing opposed surfaces of the inner and outer exhaust cases. For ease of manufacture the TEC and TEM diffuser sections that form the inner and outer exhaust cases are fabricated primarily from welded sections of rolled steel that are structurally separated by outwardly radially oriented struts having airfoil cross sections. The inner and outer exhaust cases sections generally comprise serially joined cylindrical and frusto-conical sections with generally sharp angular changes between the sections, due to the relatively small number of joined sections. Sharp angular changes do not generally foster smooth laminar exhaust airflow and encourage boundary flow separation, leading to energy wasting turbulence and backpressure increase. While smoother airflow would be encouraged by use of more gently curving interior surface annular constructions, they are relatively expensive to produce given the large diameter of IGT exhausts. Also as previously noted, it is expensive fabricate new casting/fabrication designs necessitated by changes in the IGT flow properties (e.g., new turbine blades airflow properties) or other need to upgrade (e.g., for improved exhaust longevity). It would be preferable to construct IGT exhaust systems from modular components that can be reconfigured and assembled for optimization of changed IGT flow properties rather than having to create an entirely new exhaust system design when, for example, changing turbine blade designs.

Thus, a need exists in the art for an industrial gas turbine drop-in exhaust system with modular construction that facilitates design changes for any one or more of enhanced aerodynamics, structural integrity or serviceability, for example for optimization of exhaust flow when changing turbine blade designs.

SUMMARY OF THE INVENTION

Accordingly, an object of the invention is to create an industrial gas turbine exhaust system with modular construction that facilitates design changes for any one or more of enhanced aerodynamics, structural integrity or serviceability, in response to changes in the upstream sections of the IGT, for example changes in the turbine blades.

These and other objects are achieved in accordance with embodiments of the invention by an industrial gas turbine (IGT) drop-in single-piece exhaust system (SPEX) with modular construction comprising a turbine exhaust case (TEC) mated to a turbine exhaust manifold (TEM) that have inner and outer exhaust cases constructed of a series of cylindrical and frusto-conical sections that mimic curves. In some embodiments the constructed sections include: (i) a splined (compound curve) tail cone assembly, including, by way of example, a tail cone assembly that is fabricated from a plurality of frusto-conical sections that taper downstream to a reduced diameter; or (ii) an area-ruled cross section axially aligned with one or more rows of turbine struts to compensate for strut reduction in exhaust flow cross section through the SPEX; or both features.

In other embodiments the tail cone and/or area ruled section is combined with an inlet section comprising a pair of adjoining first and second decreasing angle frusto-conical sections. In some embodiments the SPEX inlet includes an outer diameter modular stiffening ring with a lip and an inner diameter chamfered stiffening ring, both stiffening rings being oriented toward the turbine centerline for enhanced transitional flow between the last row blades and the TEC and enhanced TEC structural integrity. The respective inner and/or outer stiffening rings profiles can be optimized for airflow enhancement with specific turbine blade designs. Modular stiffening ring construction facilitates matched replacement with different blade designs merely by substituting different inner and/or outer stiffening ring sets into SPEX structures for different blade and/or IGT engine configurations.

Embodiments of the invention include TEC and/or TEM strut collars having increased acute angle side fillet radius profiles between the SPEX annularly-oriented inner and outer exhaust case inner diameter and outer diameter flow surfaces, for enhanced airflow. The strut collars are modular for facilitating changes or upgrades to the SPEX airflow characteristics (e.g., airflow characteristic changes caused by different turbine blade replacements) and easier replacement of worn collars in a new manufacture or extensive refurbishment facility. In some embodiments the collars have constant thickness vertical/radial cross section for uniform heat transfer and thermal expansion, so as to reduce likelihood of hot spot formation, burn through as well thermal or vibrational induced cracking of the TEC structure.

Other embodiments of the invention further enhance SPEX structural integrity and longevity by utilization of the previously identified constant thickness vertical/radial cross section strut collars on either or both strut inner diameter and outer diameter ends.

Additional embodiments of the invention incorporate scalloped mounting flanges at the TEC/TEM diffuser sections mating interface that when joined form the inner and outer exhaust cases, for enhanced SPEX structural integrity and longevity.

Embodiments of the invention include segmented access covers formed in the TEC diffuser section that forms the inner exhaust case that facilitate access to the last row turbine blades.

Yet other embodiments of the invention also facilitate installation and maintenance of the aforementioned multi-segment frusto-conical exhaust tail cone through accessible and easily replaceable fastening mounting structures.

More particularly the present invention described herein features an industrial gas turbine exhaust system, comprising an inner case; an outer case circumscribing the inner case in spaced relationship relative to a centerline defined by the exhaust system; and a turbine exhaust path defined between the outer and inner cases. A plurality of modular struts is interposed between the outer and inner cases, with each strut having an elongated strut support member; an inner diameter strut collar coupled to the strut support member and the inner case; and an outer diameter strut collar coupled to the strut support member and the outer case. Each respective inner and outer diameter strut collar has a generally uniform vertical/radial cross section thickness that is approximately the same as thickness of an adjoining respective outer or inner case on at least a portion of the respective collar circumference, for equalizing heat transfer and thermal deformation throughout the collar.

The present invention described herein also features an industrial gas turbine exhaust system, comprising: an inner case; an outer case circumscribing the inner case in spaced relationship relative to a centerline defined by the exhaust system; and a turbine exhaust path defined between the outer and inner cases. A plurality of struts is interposed between the outer and inner cases. The inner case defines on an inlet side thereof a stiffening ring extending inwardly toward the centerline, for enhancing exhaust stiffness and/or vibration pulsation resistance, and for enhancing non-turbulent airflow transition through the exhaust path.

Additionally, the present invention described herein features an industrial gas turbine exhaust system, comprising: an inner case; an outer case circumscribing the inner case in spaced relationship relative to a centerline defined by the exhaust system; and a turbine exhaust path defined between the outer and inner cases. A plurality of struts is interposed between the outer and inner cases. The outer case defines on an inlet side thereof an outer diameter stiffening ring with a lip extending radially inwardly therefrom into the turbine exhaust path, for enhancing exhaust stiffness and/or vibration pulsation resistance, and for enhancing non-turbulent airflow transition through the exhaust path.

The objects and features of the present invention may be applied jointly or severally in any combination or sub-combination.

BRIEF DESCRIPTION OF THE DRAWINGS

The teachings of the various embodiments of the invention can be readily understood by considering the following detailed description in conjunction with the accompanying drawings, in which:

FIG. 17 is a schematic front, upstream elevational view of the SPEX of FIGS. 1 and 3, showing the annular cross section exhaust path formed between the inner and outer cases as well as the tilted TEM and TEC struts that maintain spaced separation between the respective cases;

FIGS. 18 and 19 are respective perspective and cross sectional views of an forward TEC strut ID cast collar in accordance with an embodiment of the invention;

FIGS. 20 and 21 are respective perspective and cross sectional views of an aft TEM strut OD cast collar in accordance with an embodiment of the invention;

To facilitate understanding, identical reference numerals have been used, where possible, to designate identical elements that are common to the figures.

DETAILED DESCRIPTION

After considering the following description, those skilled in the art will clearly realize that the teachings of embodiments of the invention can be readily utilized in by an industrial gas turbine (IGT) drop-in single-piece exhaust system (SPEX) with modular construction comprising a turbine exhaust case (TEC) mated to a turbine exhaust manifold (TEM), which when combined form opposed inner and outer exhaust cases that define an exhaust flow path. The inner and outer exhaust cases are constructed of a series of splined, compound curves and/or of cylindrical and frusto-conical sections that mimic splined curves. Other modular portions of the SPEX can be utilized jointly and severally as needed to enhance airflow characteristics, including by way of example: (i) a splined, compound curve tail cone assembly that may be fabricated from a plurality of frusto-conical sections that taper downstream to a reduced diameter; (ii) an area-ruled cross section axially aligned with one or more rows of turbine struts to compensate for strut reduction in exhaust flow cross section through the SPEX; (iii) an inlet section comprising a pair of adjoining first and second decreasing angle frusto-conical sections; (iv) inner and outer diameter modular stiffening rings oriented toward the turbine centerline for enhanced transitional flow between the last row blades and the TEC and for enhanced TEC structural integrity; (v) modular replaceable strut collars having constant radius fillet profiles between the SPEX annular exhaust path inner diameter and outer diameter flow surfaces, for enhanced airflow. Other modular components of the SPEX can be utilized jointly and severally as needed to enhance integrity and longevity, including by way of example: (i) constant thickness vertical/radial cross section modular strut collars on either or both strut inner diameter and outer diameter ends; (ii) scalloped mounting flanges at the TEC/TEM interface; (iii) segmented access covers in the TEC diffuser section forming the inner exhaust case, for facilitating access to the last row turbine blades; and (iv) enhanced mounting structures for facilitating installation and maintenance of the aforementioned splined curve profile exhaust tail cone, such as a multi-segment frusto-conical exhaust tail cone mimicking a splined curve profile tail cone through accessible and easily replaceable fastening mounting structures.

Figure 1:
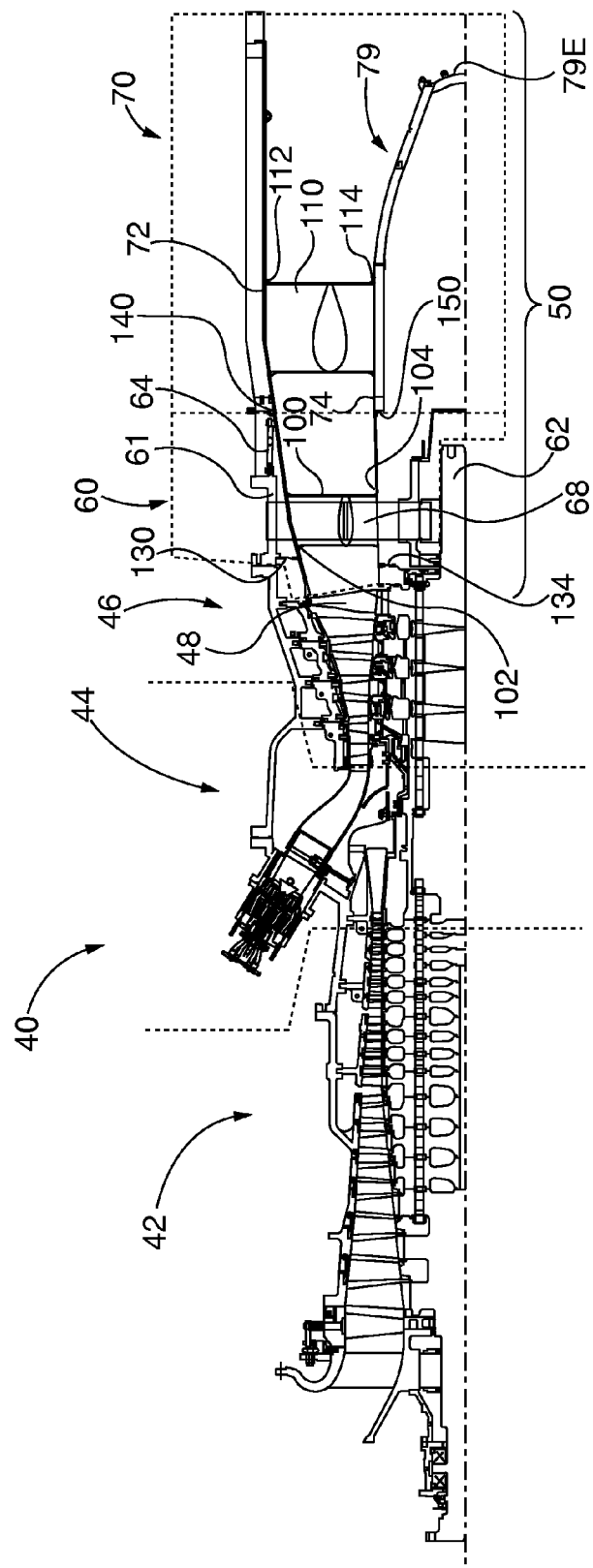
FIG. 1 is a cross section of the top half of an industrial gas turbine (IGT) incorporating an embodiment of the single piece exhaust system (SPEX) of the invention, comprising the mated TEC and TEM components that form the inner and outer exhaust cases and the exhaust flow path between opposed inner surfaces of those cases.

FIG. 1 shows an axial quarter sectional view of industrial gas turbine (IGT) 40 of the type used to generate power for an electric grid. The IGT includes compressor 42, combustion 44 and turbine 46 sections, with the turbine section including a last row of turbine blades 48. A single-piece exhaust system (SPEX) 50 that is constructed in accordance with an embodiment of the invention is coupled to the IGT 40 downstream of the turbine section 46. The last row turbine blades 48 are oriented in spaced relationship and in communication with the SPEX 50, so that the rotating blades do not contact the SPEX during the IGT 40 operation cycle.

Figure 2:
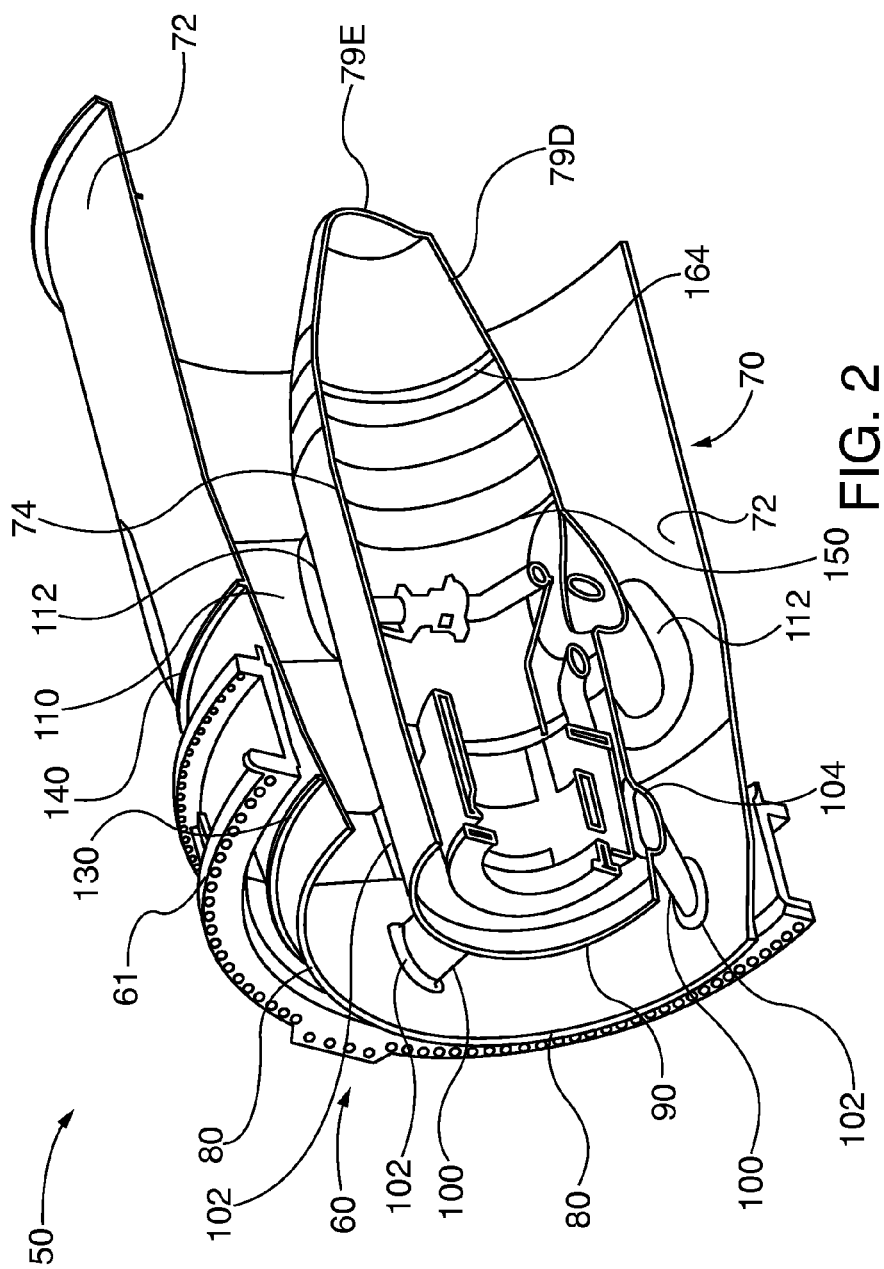
FIG. 2 is a perspective cross sectional view of the SPEX of FIG. 1 removed from the IGT.
Figure 3:
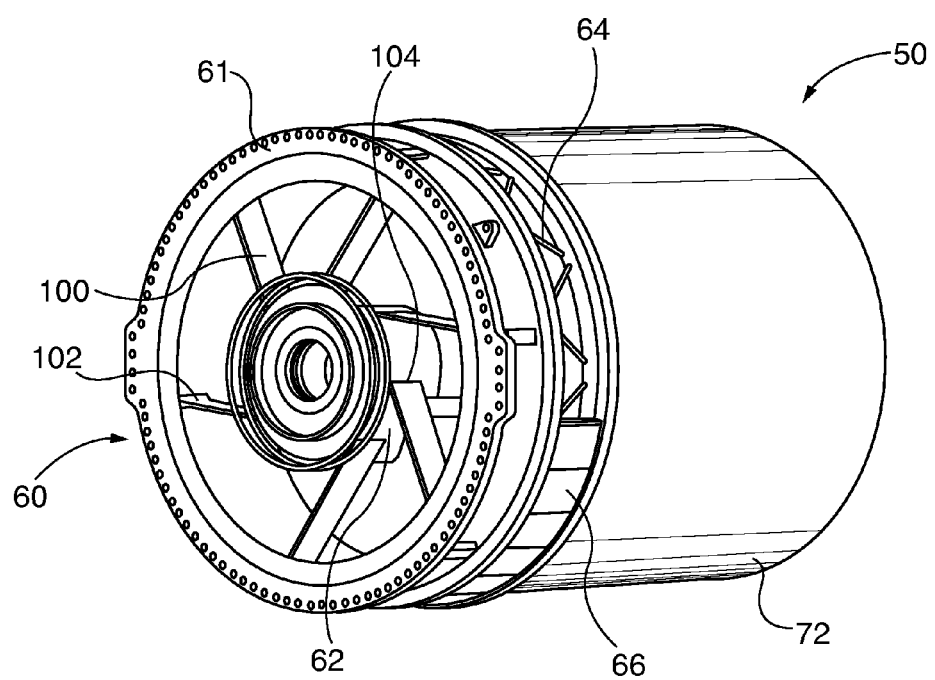
FIG. 3 is a front, upstream perspective view of the SPEX of FIG. 1.

Referring to FIGS. 1-3, the SPEX 50 comprises a generally annular-shaped turbine exhaust casing (TEC) 60, with a TEC outer casing 61 that is coupled to the turbine section 46. A bearing housing 62 is centered within TEC outer casing 61 by TEC forward support struts 68. A single-piece diffuser section is retained within the TEC 60 outer case 61. The SPEX 50 also comprises a turbine exhaust manifold (TEM) 70 with a single piece diffuser section that mates with the TEC 60 diffuser section. Referring also to FIG. 17, the combined, mated TEC/TEM diffuser sections form an outer exhaust case 72 and an inner exhaust case 74, the opposed inner surfaces of which define an annular exhaust flow path. The outer and inner exhaust case structures 72, 74 are supported in their spaced relationship by six forward TEC support struts 100 and three aft or rear TEM support struts 110. Each TEC support strut 100 circumferentially envelops its corresponding TEC forward support strut 68 in nested fashion. The TEM 70 is coupled to the TEC outer casing 61 by support rods 64. Cover plates 66 bridge and cover the circumferential gap between the TEC 60 and TEM 70. The TEM 70 is also mated and coupled to the TEC 60 by interface flanges 140 and 150 that will be described in greater detail herein with respect to the description of FIGS. 12-16. The TEM 70 can be replaced, when worn or upgraded, as a single-piece, drop-in unit by uncoupling it from the TEC 60. In this manner the TEC 60 casing 61, its rotor bearings and other structures do not have to be disturbed when replacing the TEM 70, shortening service disruptions.

Figure 4:
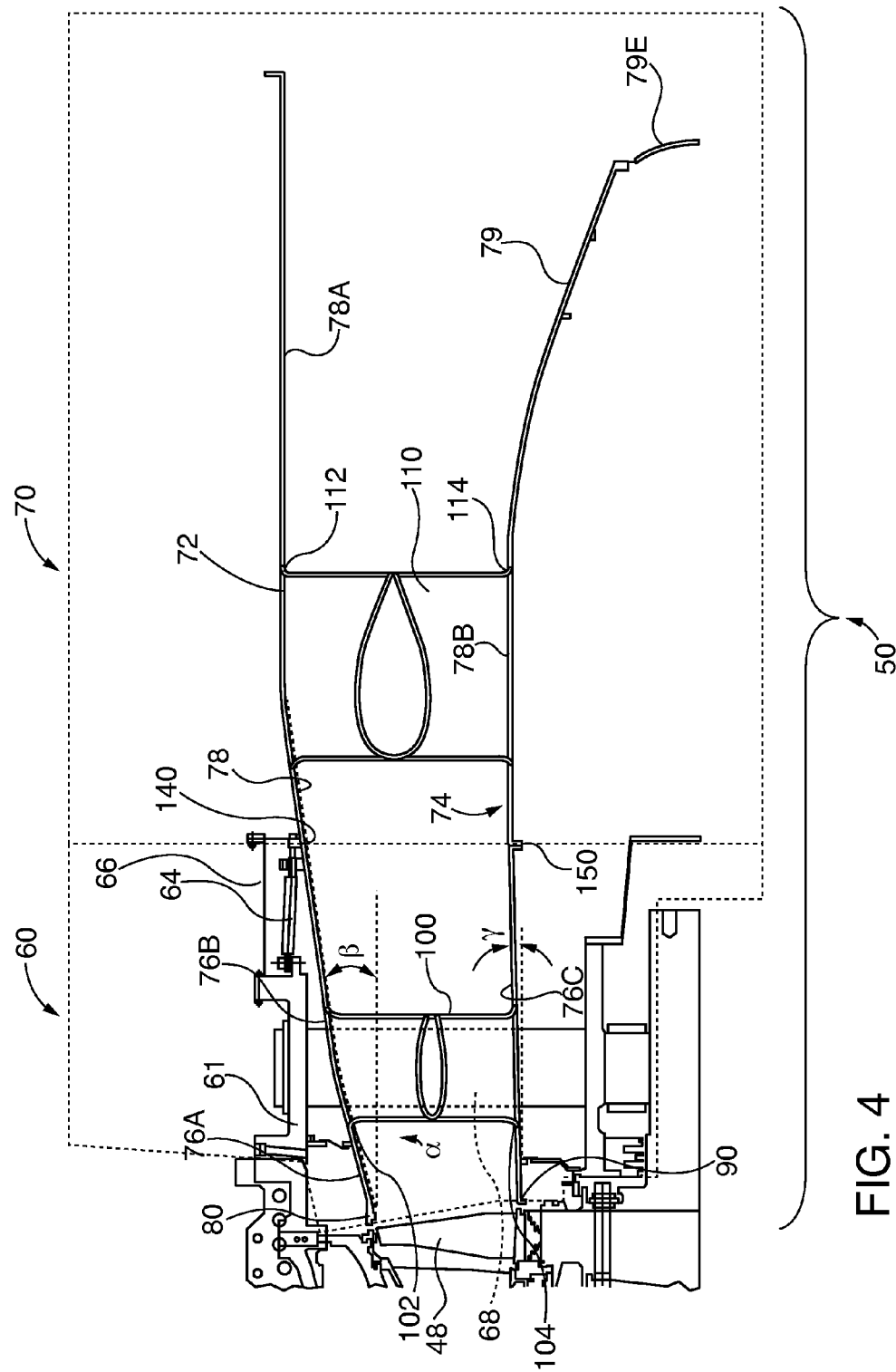
FIG. 4 is a schematic cross section of the SPEX of FIG. 1, identifying aerodynamic features of the SPEX drop-in turbine exhaust case (TEC) and turbine exhaust manifold (TEM) that when mated form the inner and outer exhaust cases, and which define the exhaust gas path of the invention.

FIG. 4 shows schematically a quartered sectional view of the SPEX 50 and its structural features that define the exhaust gas flow path from left to right. Starting at the SPEX inlet end adjoining the turbine section 40, the TEC diffuser portion that forms the outer exhaust case 72 has a first frusto-conical diffuser cone section 76A defining an angle α relative to the IGT 40 centerline. The angle α is preferably chosen to match or is less than the corresponding blade tip angle δ', shown in FIG. 6. A second frusto-conical diffuser cone section 76B, formed by the mating (at interface flange 140) TEC 60 and TEM 70, defines an angle β that preferably is shallower than angle α, as has been constructed in some previously known turbine exhaust systems. TEC 60 frusto-conical diffuser section 76C defining an angle γ establishes the opposing inner diameter portion of gas flow path. The diffuser section 76C diverging angle γ may be used to increase the enveloped volume within the SPEX 50 inner case 74 for increased service accessibility to turbine components enveloped within the inner case, such as the bearing housing 62. Alternatively the diverging angle γ may be decreased (i.e., negative angle), in order to increase the exhaust flow path cross sectional area. The SPEX 50 diffuser portion frusto-conical cone angles α, β and γ are selected so that exhaust system inner diameter angle γ is sufficiently large to provide for desired turbine component serviceability volume, without unduly hampering exhaust flow efficiency. Therefore, angle β generally increases in response to an increase in angle γ so that exhaust flow is not constricted within the annular cross section between the diffuser cone sections 76B and 76C. Exemplary angular ranges are α between approximately 6 to 19 degrees; β approximately 4 to 13 degrees and γ approximately −3 to +5 degrees.

Downstream and adjoining the ID and OD frusto-conical sections 76A-C is a cylindrical section defined by OD section 78A and ID section 78B. A splined (smooth curve profile) tail cone assembly 79 is affixed to the ID cylindrical section 78B and comprises four frusto-conical sections 79A-D that approximate a splined curved profile. Alternatively a splined single piece or multi-piece tail cone assembly may be substituted for the four frusto-conical sections 79A-D. Tail cap or cover 79E is affixed to the frusto-conical aft tail cone section 79D, to complete the shape of the extended tail cone assembly 79. Thus the SPEX 50 is constructed of a plurality of fabricated frusto-conical and cylindrical sections 76, 78, 79 that approximate splined, curved profiles for promotion of smooth exhaust gas flow and reduced back pressure. The sections 76, 78 and 79 are preferably constructed of known rolled sheet steel that are welded to form the composite SPEX 50. Due to the modular, fabricated construction, the SPEX 50 airflow profile may be modified by substituting different fabricated sections 76, 78 and 79 to form the outer 72 and inner 74 exhaust cases that are deemed best suited for a particular IGT 40 application. The fabricated section 79 can be functionally replaced by a single or multi-component tail cone formed by casting, forging, spin-forming or composite winding (e.g. carbon-carbon). Exemplary tail cone sections 79A-D length/diameter (L/D) ratios and angular ranges are set forth in Table 1:

TABLE 1

| Segment | L/D (percentage) | Angular Range (Degrees) |
|---|---|---|
| 79A | 10%-20% | 3-7 |
| 79B | 10%-20% | 8-12 |
| 79C | 10%-20% | 13-17 |
| 79D | 40%-70% | 18-22 |

Figure 5:
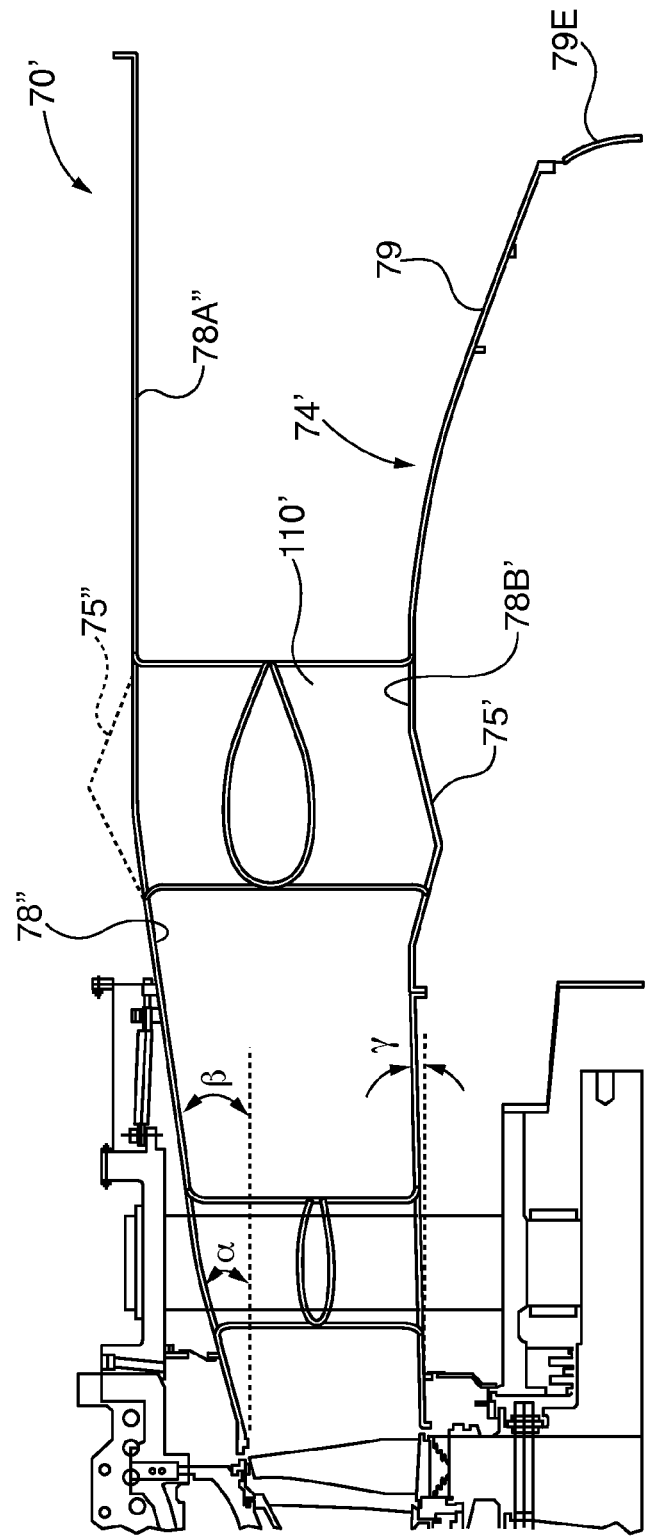
FIG. 5 is a schematic cross section of a SPEX, similar to that of FIG. 4, identifying an area ruled, wasp-like reduced inner diameter section that is axially aligned with the rear TEM struts, in accordance with an alternative embodiment of the invention.

An alternate embodiment TEC 70' is shown in FIG. 5, its primary distinguishing difference from the embodiment of FIG. 4 being a TEM inner case 74' with a narrowed, area ruled section 75' for increasing annular cross section of the exhaust gas flow path and thereby compensating for the flow restriction caused by the aft TEM struts 110 (those struts are described subsequently in greater detail herein). The ruled section 75' can be constructed from a pair of oppositely oriented frusto-conical sections and an adjoining cylindrical section 78B' that adjoins the tail cone section 79. Alternatively, the annular cross section may be increased by forming an area ruled section 75" on the TEM diffuser portion forming the outer case 72" or a combination of both types of area ruled sections 75', 75".

Figure 6:
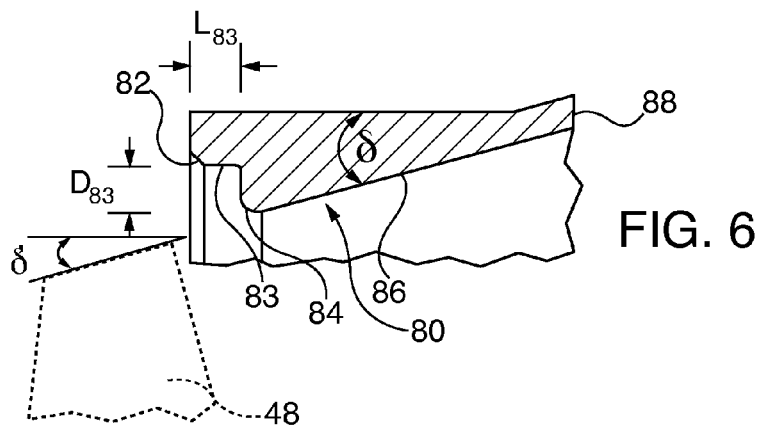
FIG. 6 is a cross section of a TEC outer diameter diffuser stiffening ring of FIG. 4, formed in the turbine exhaust outer case, in accordance with an embodiment of the invention.

Further SPEX 50 airflow enhancements are achievable by introduction of outer diameter (OD) stiffening ring 80, whose airflow characteristics can be modified for compatibility with different turbine blades 48. The OD stiffening ring 80 effectively bridges a potential airflow leakage gap between the turbine blades 48 and the outer exhaust case 72. Referring to FIG. 6, the OD stiffening ring 80 is coupled to the TEC first diffuser cone 76A and includes a chamfered entrance 82 that reduces likelihood of backpressure that might otherwise occur if it were a sharp edge. A generally annular notch 83 optionally is formed in the OD stiffening ring 80 downstream the chamfered entrance 82 having an axial length $L_{83}$ and depth $D_{83}$ whose respective dimensions are chosen to provide clearance for the turbine blades 48 during the turbine 40 operational cycles. The OD stiffening ring 80 also defines a convex lip 84 with a radius that is oriented toward the IGT 40 centerline and transitions to a ramped diverging cone 86 that defines an angle δ with respect to the centerline. The angle δ preferably matches, or is less than, the blade tip angle δ'. Similarly, the first diffuser cone section 76A angle α matches or is less than angle δ. OD stiffening ring trailing end 88 is coupled to the TEC 60 adjoining first diffuser cone 76A.

Figure 7:
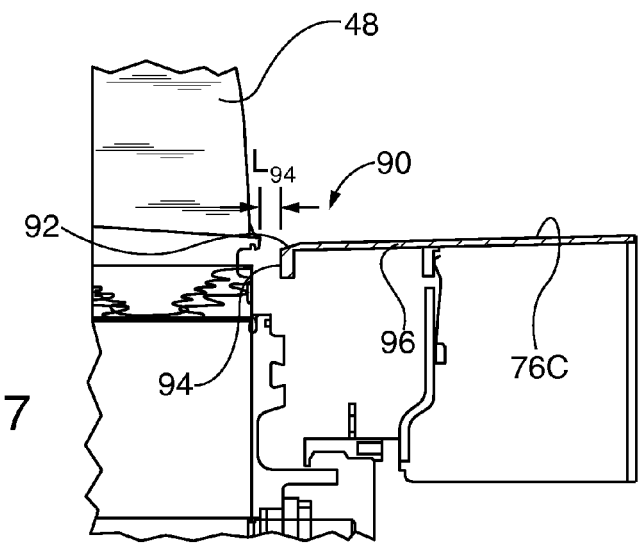
FIG. 7 is a cross section of the TEC inner diameter diffuser stiffening ring of FIG. 4, formed in the turbine exhaust inner case, in accordance with an embodiment of the invention.
Figure 8A:
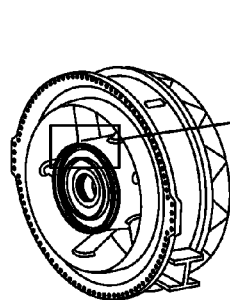
FIGS. 8A, 8B and 9-11 are perspective views of a segmented forward inner diameter cut out and access cover of the TEC, for service access to last row turbine blades, in accordance with an embodiment of the invention.
Figure 8B:
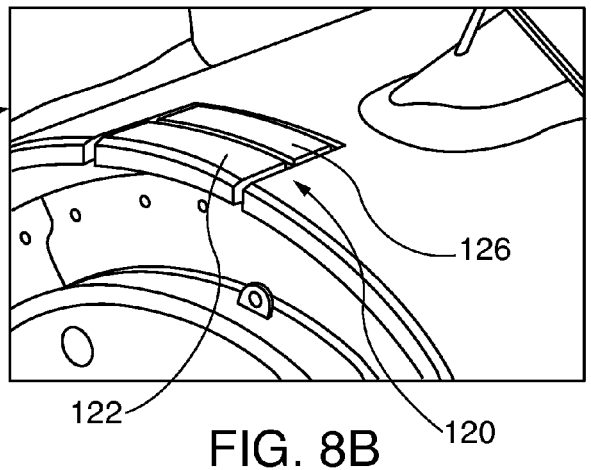

Complimentary inner diameter (ID) stiffening ring 90 (FIG. 7) similarly enhances airflow characteristics and can be modified for compatibility with different turbine blades 48. The ID stiffening ring 90 effectively bridges a potential airflow leakage gap between the root portion of the respective the turbine blades 48 and the inner exhaust case 74 formed by the TEC 60. Referring to FIG. 7, the ID stiffening ring 90 has a chamfered profile 92 of approximately 10-30 degrees relative to the exhaust path cross section. The chamfer 92 should be of sufficient axial length to insure no forward facing step from the blade 48 flow path to the SPEX 50 flow path. The chamfered surface 92 facilitates smooth airflow transition from the blades to the SPEX 50. Otherwise, a sharp edge at the location of the chamfered profile 92 would increase the possibility of backpressure. The ID stiffening ring 90 includes an inwardly oriented portion 94 and a generally cylindrical section 96 that is joined to the inner exhaust case 74 diffuser frusto-conical sections 76C. Profiles of the ID stiffening ring 90 chamfer 92 and inwardly oriented portion 94, as well as the axial separation gap $L_{94}$ between the ring and blades 48 are preferably selected for airflow compatibility with a given blade set 48. Thus, the ID stiffening ring 90 as well as the OD stiffening ring 80 profiles and blade set 48 may be selected and designated as a modular matched set to be installed together during a gas turbine 40 initial manufacture or subsequent rebuild/retrofit.

In addition to the aforementioned airflow enhancements, the respective OD stiffening ring 80 lip 84 and ID stiffening ring 90 portion 94 enhance TEM 70 structural strength and rigidity, which in turn better assure consistent airflow cross section, resist thermal deformation and lessens exhaust pulsation-induced vibration/noise.

Figure 9:
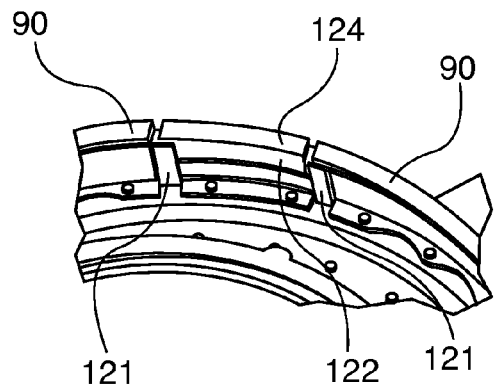
Figure 10:
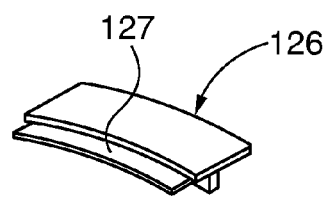
Figure 11:
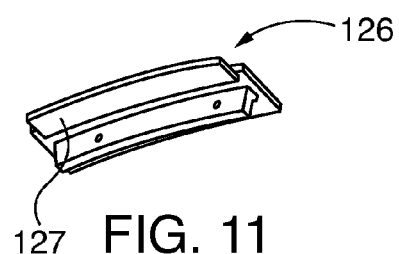

The TEC 60 incorporates an access cut out and service access cover 120 on the twelve o'clock circumferential position for last row turbine blade 48 and rotor balancing service access, as shown in FIGS. 8A and 8B and 9-11. While access cut outs have been used in the past, prior cut outs did not have sufficient axial length to accommodate replacement of newer generation, larger width last row turbine blades. Merely increasing axial length of existing cut out and cover single-piece designs introduces structural reinforcement challenges that ultimately increase service time for cover removal and reinstallation. The new embodiment service access cover 120 of the present invention has structural and functional flexibility to accommodate access and replacement of a wider range of last row turbine blades 48 by incorporating a pair of first and second segmented covers 122 and 126. The first access cover 122 is easily removed for rotor balancing services and incurs no significant additional outage time during that service procedure. The second access cover is removed during more complex outages requiring turbine blades 48 removals. As shown in FIG. 9, lateral axial periphery of the cutout is reinforced by service access cover supports 121. Both the access covers 122 and 124 rest on and is coupled to the cover supports 121. The first access cover 122 has a first segment front lip 124 for aerodynamic functional continuity of the TEM ID ring lip 94, while the aft portion of the cover rests on and is coupled to the second cover flange 127.

Figure 12:
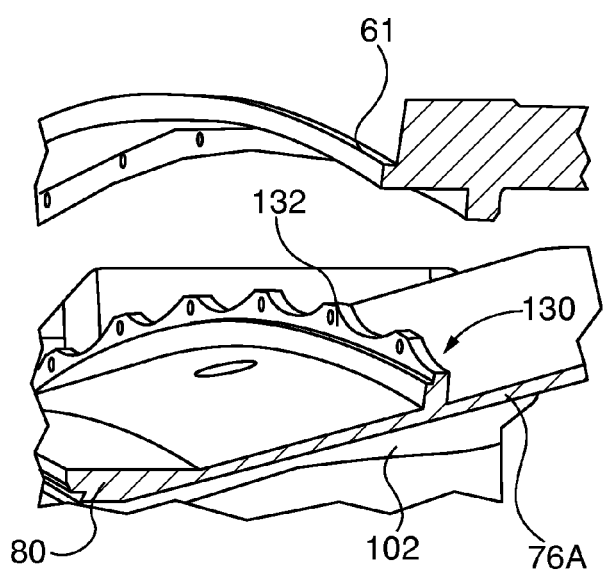
FIG. 12 is a perspective view of a TEC outer diameter (OD) seal flange, in accordance with an embodiment of the invention.
Figure 13:
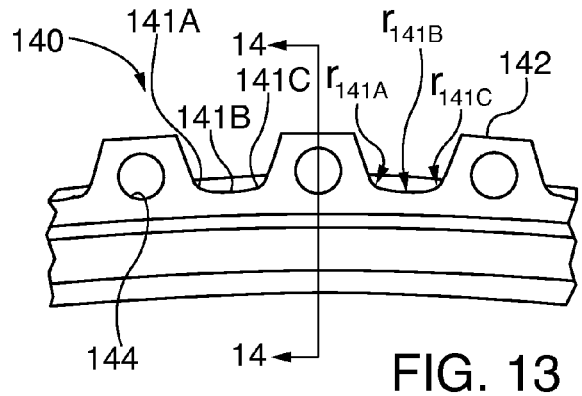
FIGS. 13 and 14 are respective fragmented front elevational and cross sectional views of a TEC/TEM interface aft OD flange, in accordance with an embodiment of the invention.
Figure 14:
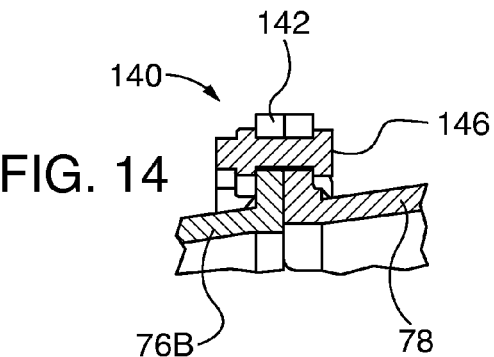
Figure 15:
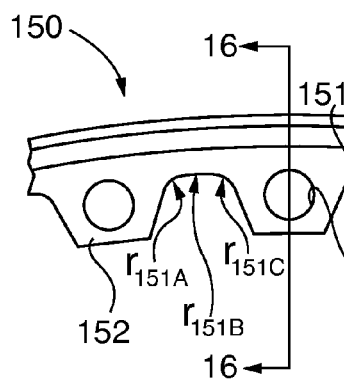
FIGS. 15 and 16 are respective fragmented front elevational and cross sectional views of a TEC/TEM interface aft inner diameter (ID) flange, in accordance with an embodiment of the invention.
Figure 16:
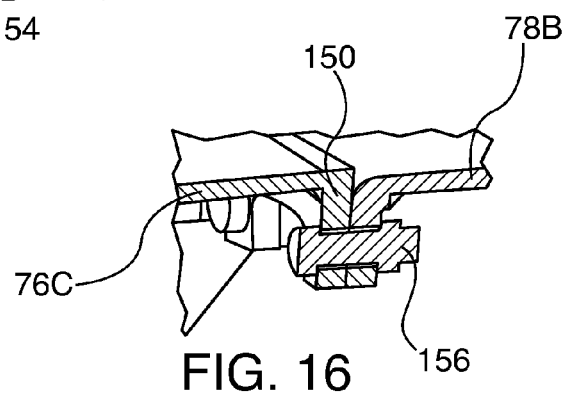

The TEC casing 61 60 and TEC 70 diffuser portion 76A-C are coupled to each other in nested orientation by forward OD and ID interfaces 130, 134, that include known finger seals, which are coupled to scalloped flanges, such as the scalloped flange 132 of OD interface 130 (see FIGS. 1 and 12). OD and ID aft seal flanges interfaces 140, 150 are shown in FIGS. 13-16. Each aft flange interface also includes respective multi-radius scalloped flanges 142, 152, defining through bores 144, 154 for receipt of fasteners 146, 156. Each scalloped flange 142 has a multi-radius, compound curve profile, with a first curved edge 141A defining a radius $r_{141A}$ transitioning to a second, longer or shallower radius portion 141B of radius $r_{141B}$ that is 10-13 times longer than $r_{141A}$ and back to a third curved edge 141C with radius $r_{141C}$ that generally matches $r_{141A}$. Scalloped flange 152 similarly defines a multi-radius curved profile 151A-151C with similarly relatively proportioned radii $r_{141A}$-$r_{151C}$. Each respective scalloped flange 142, 152 mates with a corresponding TEM 70 flange. The mating flange pairs are fastened together with the respective fasteners 146, 156. The scalloped flanges 132, 142, 152 improve structural and gas flow sealing integrity by each individual scallop being independently flexible relative to all of the other scallops that collectively form the entire circumferential flange structure. Individual scallop flexure capability accommodates localized thermal, mechanical and vibrational stress without buckling, cracking or otherwise deforming the rest of the circumferential flange. The multi-radii scalloped flanges 142, 152 increase structural integrity of the assembled SPEX 50 and reduces low cycle structural fatigue that is induced during the cyclic temperature variations inherent in IGT engine 40 start/operation/stop for periodic inspection and service cycles.

Another modular construction feature of embodiments of the invention that enhance aerodynamic, structural and manufacture/service performance of the SPEX 50 are modular TEC collars 102, 104 for the TEC front support strut 100 and modular TEM collars 112, 114 for the TEM rear support strut 110, shown schematically in FIGS. 4 and 17. The modular collars 102, 104, 112, and 114 are welded to the elongated support member portion of their corresponding struts 100 or 110 and the corresponding inner or outer diameter of the TEM 70 surfaces that form the annular gas flow path. Aerodynamic performance of the fore and aft strut/ID-OD diffuser interfaces can be altered by substitution of different modular collars that are optimized for specific IGT applications. In new manufacture IGTs, one of a family of struts and collars can be chosen to optimize or enhance a specific IGT turbine blade 48 configuration. Later, during subsequent service maintenance, the struts and associated collars can be upgraded or replaced to enhance aerodynamic flow properties of the SPEX 50 in response to other changes (e.g., new turbine blading) made within the IGT 40.

As shown in FIG. 17, support struts 100 and 110 are often leaned tangentially at angle θ relative to the exhaust system 50 radial axes to reduce the thermally induced stresses in typical ring-strut-ring configurations. However, there is a support strut design thermal stress mitigation and aerodynamic efficiency tradeoff Compared to radially oriented struts, the leaned struts generally increase aerodynamic losses by increasing the total amount of blockage in the flow path and by increasing the local flow diffusion in the acute angle corners (see e.g., $R_B$ and $R_D$ fillet radius reference locations in FIG. 17) made by the strut surface and the flow path. The diffusion increase occurs because, on the acute angle side, the leaned strut surface faces and directly interacts with the local flow path end wall. As flow travels aft from the strut leading edge (LE), it is accelerated to higher velocities because the increasing thickness of the strut essentially squeezes the flow against the end wall. The opposite happens as the flow travels aft from the strut maximum thickness location. In this case the strut thickness (or blockage) decreases quickly which, in turn, quickly increases the available flow area, and causes higher local flow diffusion. Increased diffusion can lead to flow separation and high total pressure loss. The effect increases with strut lean angle, strut maximum thickness, flow Mach number and strut incidence. The aerodynamic penalty for leaned struts can be mitigated by use of large fillets in the acute angle corners. For relatively thick struts that are leaned 20 to 30 degrees (A) performance loss can be minimized by use of fillets with a radius ($R_B$, $R_D$) of 15 to 40% of the strut maximum thickness. For these purposes, struts can be considered relatively thick (or fat) when they exceed a maximum thickness to chord ratio of 25%. The fillet sizes applied to the acute angle corners should be increased for higher leans and thicker struts and reduced for lower leans and thinner struts. Fillet radii $R_A$, $R_C$ on the obtuse angle side of the strut 110, 112 is not aerodynamically critical. Changes in turbine blade 48 flow properties impacts exhaust system aerodynamic efficiency and often require re-optimization of support strut/exhaust case interface acute angle fillet radius $R_B$, $R_D$.

Modular strut collars 102, 104, 112 and 114 that constructed in accordance with embodiments of the present invention facilitate relatively easy change in strut angle θ, if required to do so for structural reasons as well as the acute angle fillet radii $R_B$, $R_D$ when required to optimize aerodynamic efficiency changes in blade 48 aerodynamic properties. The modular strut collars of the present invention also balance thermal stress constraints while optimizing aerodynamic efficiency. FIGS. 18 and 19 show an exemplary ID TEC collar 104, featuring aerodynamically enhancing constant fillet radius $R_A$, $R_B$ flow path fillets. Similarly, FIGS. 20 and 21 show an exemplary OD TEM collar 112 with constant fillet radius $R_C$, $R_D$ flow path fillets to increase service life of the SPEX. Generally for aerodynamic efficiency, the respective strut collars 104, 112 acute angle fillet radii $R_B$ and $R_D$ is chosen as a function of the strut centerline tilt angle θ relative to the SPEX 50 radius and strut maximum thickness.

As the respective strut collars 104, 112 obtuse angle fillet radii $R_A$ and $R_C$ are not critical to aerodynamic performance their radii are chosen to benefit exhaust case/strut interface thermal fatigue resistance to provide for collar 104, 112 constant thicknesses in a given radial orientation (i.e., the vertical direction in FIGS. 19 and 21). Desirably the strut collars 102, 104, 112 and 114 have radially or vertically oriented constant thickness cross sections on the obtuse angle sides $R_A$, $R_C$ that preferably vary by no more than +/−10 percent for uniform heat transfer, structural and thermal stress resistance strength and more uniform expansion and extended bases for increased contact with respective mating ID or OD TEM surfaces. It is also preferred that the respective strut collars have thickness approximating thickness of the mating exhaust inner or outer case 72, 74, but due to fabrication and structural/fatigue strength constraints vertical cross sectional thickness on the acute angle circumferential locations may be 50-250% greater than the mating exhaust case thickness. Strut collar cross sectional thickness may vary about the strut circumference, but it is desirable to maintain constant thickness vertical cross section preferably varying by no more than 10% at any given circumferential location. On the acute angle circumferential portions of the strut collar thickness may vary by up to 250%. Strut collars 102, 104, 112 and 114 that preferably incorporate constant vertical thickness at any circumferential location and that preferably match thickness of the mating exhaust case 72, 74 reduce likelihood of cracking or other separation from the TEM during IGT operation, which extends SPEX 50 service life. The strut collars 102, 104, 112 and 114 are cast, forged or fabricated from formed metal plates.

Figure 22:
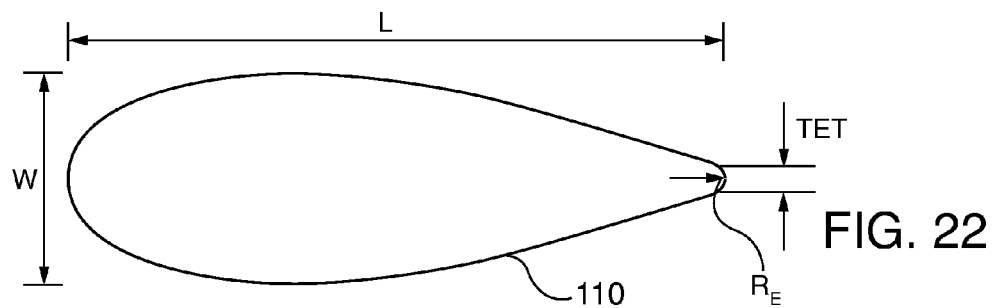
FIG. 22 is a cross sectional view of an aft TEM strut platform, in accordance with an embodiment of the invention.
Figure 23:
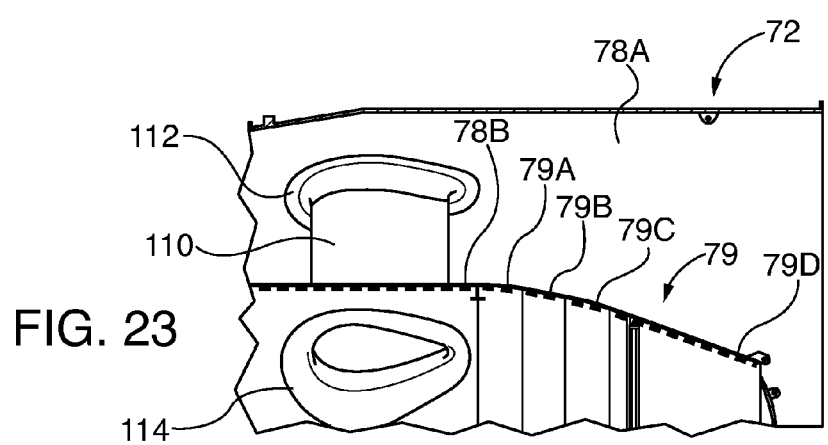
FIG. 23 is a quartered cross-sectional view of the SPEX outlet airflow path including the tail cone, in accordance with an embodiment of the invention.

The TEM strut 110 aerodynamic footprint is shown in FIG. 22. The strut 110 features an extended length axial chord length L, with a relatively sharp trailing edge radius $R_E$ for enhanced aerodynamic performance. Exemplary trailing edge radii $R_E$ range from 10 to 20% of the strut chord, facilitating a thin trailing edge thickness (TET) and can be used effectively with struts of maximum thickness W to chord length L ratio of up to 40%. The multi-segmented tail cone 79 structural features are highlighted in elevational view FIG. 23. Compared to known tail cones that incorporate a single frusto-conical profile tail cone, tail cones of the present invention incorporate splined, curved tail cones or plural serial axially aligned frusto-conical sections that mimic a splined curved profile. In the embodiment of FIG. 23 the tail cone incorporates first through third frusto-conical sections 79 A-C and a frusto-conical tail cone section 79D that terminates in an aft cap or cover 79E. While the exemplary tail cone 79 embodiment of FIG. 23 incorporates four frusto-conical sections, tail cones having two or more such sections can be fabricated. Exemplary tail cone sections 79A-D length/diameter (L/D) ratios and angular ranges were previously set forth in Table 1. The length of the tail cone 79 (from the TEM strut 100 trailing edge) should range from about 1 to 1.5 diameters of the upstream exhaust inner case 74 ID cylindrical center body 78B. This allows significant aerodynamic benefit without introducing excessive cantilevered mass that can introduce low mechanical natural frequencies. The tail cone should reduce the exhaust inner case 74 cylindrical center body 78 exit area by about 50 to 80% in a smooth splined or piece-wise smooth fashion (e.g., by joinder of frusto-conical portions such as 79A-D), so as to not cause premature flow separation. The achievable area reduction will depend on the local exhaust flow field of the diffuser. For example, hub strong velocity profiles in a moderately diffusing flow path will allow for shorter tail cones with low exit area. The opposite is true for OD strong velocity profiles and strongly diffusing flow paths.

Figure 24:
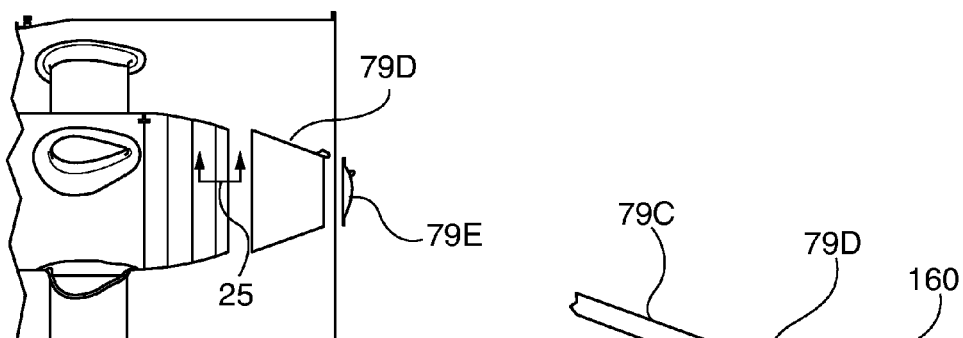
FIG. 24 is an axial elevational view of the tail cone of FIG. 23, showing the removable aft tail cone section and mating cap/cover assemblies for service access to the IGT bearing housing in the TEC, in accordance with an embodiment of the invention.
Figure 25:
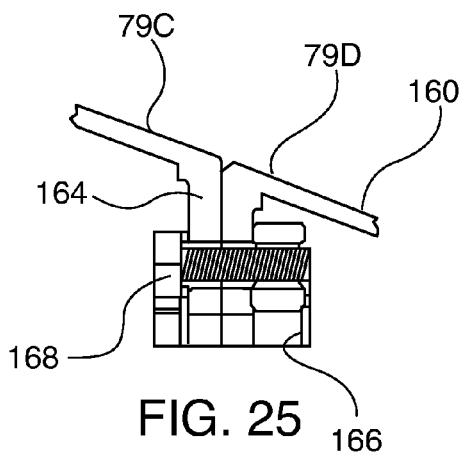
FIG. 25 is a cross sectional view of the aft tail cone section attachment mechanism, taken along 25-25 of FIG. 24, in accordance with an embodiment of the invention.
Figure 26:
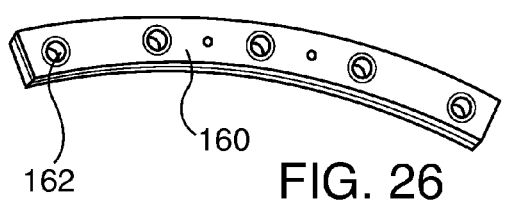
FIG. 26 is a perspective view of a nut plate of the aft tail cone section attachment mechanism, in accordance with an embodiment of the invention.

The aft tail cone 79D and aft cap 79E sections are secured to the TEM 70 by a fastening system (FIGS. 24-26) that facilitates easy removal and reinstallation for IGT rear bearing and other maintenance/inspection services. The fastening system features sector-shaped nut plates 160 that incorporate replaceable female threaded inserts 162, such as HELICOIL inserts. Using the aft tail cone 79D attachment structure of FIG. 25 as an example, the third tail cone 79C ring flange 164 is coupled to the tail cone extension ring flange 166 by threaded fasteners 168 that pass through bores defined by each flange. The fasteners 168 are threaded into the nut plate 160 female threaded inserts 162. The nut plates 160 offer easier fabrication and replacement (including replacement of worn female threaded inserts 162) than commonly used permanently welded in place threaded nuts.

The SPEX 50 exhaust system modular construction of OD stiffening ring with δ, ID stiffening ring, variable diffuser angles α,β, γ, modular ruled area, modular support struts 110, 112 with modular collars facilitate relatively easy optimization of exhaust system aerodynamic and structural properties in response to changes in turbine blade 48 airflow properties. The modular components can be configured via virtual airflow and thermal simulation, with the virtual components utilized as templates for physically manufactured components. Component sets of turbine blades and exhaust system modular components can be matched for optimal performance, comparable to a kit of parts adapted for assembly into a complete IGT 40 and exhaust system 50. Therefore a change in turbine blade 48 configuration/airflow properties can be accommodated in an original build, service or field repair facility by modular replacement of exhaust system components to assure that the new IGT 40 blade/exhaust system 50 configuration optimized for exhaust airflow and structural performance.

Although various embodiments that incorporate the teachings of the invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted,"

"connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. An industrial gas turbine exhaust system, comprising:
    an inner case;
    an outer case circumscribing the inner case in spaced relationship relative to a centerline defined by the exhaust system;
    a turbine exhaust path defined between the outer and inner cases;
    a plurality of modular struts interposed between the outer and inner cases, each strut having:
        an elongated strut support member;
        an inner diameter strut collar coupled to the strut support member and the inner case; and
        an outer diameter strut collar coupled to the strut support member and the outer case;
        each respective inner and outer diameter strut collar having a generally uniform vertical/radial cross section thickness that is approximately the same as thickness of an adjoining respective outer or inner case on at least a portion of the respective collar circumference, for equalizing heat transfer and thermal deformation throughout the collar;
    a tail cone coupled to and projecting axially downstream from the inner case;
    a removable tail cone extension for access to gas turbine components covered by the exhaust system when said system is installed on an industrial gas turbine; and
    a selectively removable tail cover coupled to a downstream end of the tail cone extension;
the tail cone extension selectively coupled to the tail cone with sector shaped nut plates receiving mating threaded fasteners retained within the tail cone and extension interior that are accessible by removing the tail cover.

2. The system of claim 1, further comprising:
    the struts tilted at an angle relative to a radius defined by the exhaust system centerline; and
    the inner diameter strut collar and the outer diameter strut collar each having generally uniform vertical/radial cross section thickness at least on an obtuse angle side of the collar that varies within approximately +/−10%.

3. The system of claim 1, the inner diameter strut collar and the outer diameter strut collar each comprising metal castings welded to the strut support member and its respective case.

4. The system of claim 1, the inner diameter strut collar and the outer diameter strut collar each comprising metal forgings welded to the strut support member and its respective case.

5. The system of claim 1, further comprising a scalloped seal flange on a circumferential surface of one or both of the inner case or outer case for mounting its respective case on the gas turbine.

6. The system of claim 1, further comprising an outer diameter stiffening ring with a lip extending radially inwardly therefrom into the turbine exhaust path on an inlet side of the outer case, for enhancing exhaust stiffness and/or vibration pulsation resistance.

7. The system of claim 1, the inner case defining a stiffening ring extending inwardly toward the centerline on an inlet side of the inner case, for enhancing exhaust stiffness and/or vibration pulsation resistance.

8. The system of claim 7, further comprising a segmented service access cutout having a first removable portion formed in the inner case stiffening ring and a second removable portion formed in the inner case, for accessing gas turbine components covered by the exhaust system when said system is installed on the industrial gas turbine.

9. An industrial gas turbine apparatus, comprising:
    a compressor section; a combustor section;
    a turbine section including a last downstream row of turbine blades that are mounted on a rotating shaft;
    a turbine exhaust case (TEC) coupled to a downstream end of the turbine section; and
    the industrial gas turbine exhaust system of claim 1 coupled to the TEC.

10. An industrial gas turbine exhaust system, comprising:
    an inner case;
    an outer case circumscribing the inner case in spaced relationship relative to a centerline defined by the exhaust system;
    a turbine exhaust path defined between the outer and inner cases;
    a plurality of struts interposed between the outer and inner cases; and
    the inner case defining on an inlet side thereof a stiffening ring extending inwardly toward the centerline, for enhancing exhaust stiffness and/or vibration pulsation resistance, and for enhancing non-turbulent airflow transition through the exhaust path;
    a tail cone coupled to and projecting axially downstream from the inner case;
    a removable tail cone extension for access to gas turbine components covered by the exhaust system when said system is installed on an industrial gas turbine; and
    a selectively removable cover coupled to a downstream end of the tail cone extension;
    the tail cone extension selectively coupled to the tail cone with sector shaped nut plates receiving mating threaded fasteners retained within the tail cone and extension interior that are accessible by removing the cover.

11. The system of claim 10, the outer case defining on an inlet side thereof an outer diameter stiffening ring with a lip extending radially inwardly therefrom into the turbine exhaust path, for enhancing exhaust stiffness and/or vibration pulsation resistance, and for enhancing non-turbulent airflow transition through the exhaust path.

12. The system of claim 10, further comprising a segmented service access cutout having a first removable portion formed in the inner stiffening ring and a second removable portion formed in the inner case, for accessing gas turbine components covered by the exhaust system when said system is installed on the industrial gas turbine.

13. The system of claim 10, further comprising a scalloped seal flange on a circumferential surface of one or both of the inner case or outer case for mounting its respective case on the gas turbine.

14. An industrial gas turbine apparatus, comprising:
    a compressor section;
    a combustor section;
    a turbine section including a last downstream row of turbine blades that are mounted on a rotating shaft;
    a turbine exhaust case (TEC) coupled to a downstream end of the turbine section; and
    the industrial gas turbine exhaust system of claim 10 coupled to the TEC.

15. An industrial gas turbine exhaust system, comprising:
    an inner case;

an outer case circumscribing the inner case in spaced relationship relative to a centerline defined by the exhaust system;
a turbine exhaust path defined between the outer and inner cases;
a plurality of struts interposed between the outer and inner cases; and
the outer case defining on an inlet side thereof an outer diameter stiffening ring with a lip extending radially inwardly therefrom into the turbine exhaust path, for enhancing exhaust stiffness and/or vibration pulsation resistance, and for enhancing non-turbulent airflow transition through the exhaust path;
a tail cone coupled to and projecting axially downstream from the inner case;
a removable tail cone extension for access to gas turbine components covered by the exhaust system when said system is installed on an industrial gas turbine; and
a selectively removable cover coupled to a downstream end of the tail cone extension;
the tail cone extension selectively coupled to the tail cone with sector shaped nut plates receiving mating threaded fasteners retained within the tail cone and extension interior that are accessible by removing the cover.

16. The system of claim 15, further comprising a scalloped seal flange on a circumferential surface of one or both of the inner case or outer case for mounting its respective case on the gas turbine.

17. An industrial gas turbine apparatus, comprising:
a compressor section;
a combustor section;
a turbine section including a last downstream row of turbine blades that are mounted on a rotating shaft;
a turbine exhaust case (TEC) coupled to a downstream end of the turbine section; and
the industrial gas turbine exhaust system of claim 15 coupled to the TEC.

* * * * *